US010152480B2

(12) United States Patent
Sharp et al.

(10) Patent No.: US 10,152,480 B2
(45) Date of Patent: Dec. 11, 2018

(54) ARCHIVING INDEXED DATA

(71) Applicant: Splunk Inc., San Francisco, CA (US)

(72) Inventors: Clint Sharp, Oakland, CA (US); Petter Eriksson, San Francisco, CA (US); Ledion Bitincka, Pasadena, CA (US); Jason Szeto, Redwood City, CA (US); Elizabeth Lin, San Francisco, CA (US); Nima Haddadkaveh, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 449 days.

(21) Appl. No.: 14/611,225

(22) Filed: Jan. 31, 2015

(65) Prior Publication Data

US 2016/0224570 A1 Aug. 4, 2016

(51) Int. Cl.
*G06F 17/30* (2006.01)

(52) U.S. Cl.
CPC .. *G06F 17/30073* (2013.01); *G06F 17/30336* (2013.01)

(58) Field of Classification Search
CPC ......... G06F 17/30336; G06F 17/30073; G06F 17/30864; G06F 17/30554; G06F 17/241; G06F 17/30; G06F 3/0482; G06F 3/04842; G06F 3/0484; G06F 17/30867; G06F 17/30312; G06F 3/04817; G06F 17/30575; G06F 17/30377; G06T 11/206; H04L 41/22; H04L 43/045; H04L 43/06; H06L 63/1425; G06G 17/2705; G06N 5/022; G06Q 10/063

See application file for complete search history.

(56) References Cited

U.S. PATENT DOCUMENTS

| 5,774,377 | A  | * | 6/1998 | Eidson | H04M 15/74 710/260 |
| 6,538,623 | B1 | * | 3/2003 | Parnian | G06F 1/163 707/E17.004 |
| 7,822,660 | B1 | * | 10/2010 | Donoho | G06Q 40/00 705/35 |
| 8,112,425 | B2 | * | 2/2012 | Baum | G06F 17/30551 707/746 |
| 8,515,963 | B1 | * | 8/2013 | Blank, Jr. | G06F 17/30864 707/741 |
| 8,793,225 | B1 | * | 7/2014 | Bitincka | G06F 17/30545 707/608 |
| 2005/0066225 | A1 | * | 3/2005 | Rowan | G06F 11/1435 714/5.11 |
| 2006/0136451 | A1 | * | 6/2006 | Denissov | G06F 11/3419 714/E11.195 |
| 2007/0113031 | A1 | * | 5/2007 | Brown | G06F 12/023 711/160 |

(Continued)

*Primary Examiner* — Anh Ly
(74) *Attorney, Agent, or Firm* — Artegis Law Group, LLP

(57) ABSTRACT

Raw data in distributed servers is divided into groups of data called buckets containing raw data that have timestamps that fall within a specific time range. When a bucket becomes inactive a server can archive the bucket to an external storage system. The external storage system containing archived data may be specified in a search query. Archived data from the external storage system is obtained, processed, and a search performed on the processed archived data using the search query.

29 Claims, 13 Drawing Sheets

(56) References Cited

U.S. PATENT DOCUMENTS

| | | | | |
|---|---|---|---|---|
| 2007/0118491 A1* | 5/2007 | Baum | G06K 9/6217 706/20 |
| 2007/0283194 A1* | 12/2007 | Villella | G06F 11/3476 714/57 |
| 2008/0215546 A1* | 9/2008 | Baum | G06F 17/30551 707/E17.108 |
| 2008/0222684 A1* | 9/2008 | Mukraj | H04L 67/1012 725/86 |
| 2009/0083184 A1* | 3/2009 | Eisen | G06Q 20/10 705/50 |
| 2009/0317051 A1* | 12/2009 | Millington | G11B 27/034 386/278 |
| 2009/0317053 A1* | 12/2009 | Morley | H04N 5/783 725/110 |
| 2010/0070448 A1* | 3/2010 | Omoigui | H01L 27/1463 706/47 |
| 2010/0183034 A1* | 7/2010 | Kroepfl | H04L 67/1095 370/503 |
| 2011/0191361 A1* | 8/2011 | Gupta | G06F 17/30424 707/763 |
| 2011/0208934 A1* | 8/2011 | Tang | G06F 17/30147 711/162 |
| 2011/0313973 A1* | 12/2011 | Srivas | G06F 17/30194 707/634 |
| 2012/0158655 A1* | 6/2012 | Dove | G06F 17/30587 707/627 |
| 2012/0197934 A1* | 8/2012 | Zhang | G06F 17/30516 707/770 |
| 2012/0221589 A1* | 8/2012 | Shahar | G06F 17/30551 707/758 |
| 2012/0233000 A1* | 9/2012 | Fisher | G06Q 30/02 707/E17.005 |
| 2012/0317338 A1* | 12/2012 | Yi | G06F 12/0868 711/103 |
| 2013/0244909 A1* | 9/2013 | Windemuth | G01N 33/50 702/21 |
| 2013/0318236 A1* | 11/2013 | Coates | H04L 43/045 709/224 |
| 2013/0318536 A1* | 11/2013 | Fletcher | G06F 9/5011 718/104 |
| 2013/0318604 A1* | 11/2013 | Coates | H04L 63/1416 726/22 |
| 2014/0149380 A1* | 5/2014 | Ahmed | G06F 17/30867 707/709 |
| 2014/0201225 A1* | 7/2014 | Deshmukh | G06F 17/30286 707/758 |
| 2014/0201355 A1* | 7/2014 | Bishnoi | H04L 41/069 709/224 |
| 2014/0279367 A1* | 9/2014 | Srivastava | G06Q 40/04 705/37 |
| 2014/0337354 A1* | 11/2014 | Blank, Jr. | G06F 17/30864 707/741 |
| 2014/0351233 A1* | 11/2014 | Crupi | G06F 17/30516 707/706 |
| 2014/0358959 A1* | 12/2014 | Bishnoi | G06F 17/30516 707/769 |
| 2015/0066715 A1* | 3/2015 | Carrier | G06Q 50/06 705/31 |
| 2016/0004733 A1* | 1/2016 | Cao | G06F 11/0709 707/755 |
| 2016/0055225 A1* | 2/2016 | Xu | G06F 17/30575 707/624 |
| 2016/0055499 A1* | 2/2016 | Hawkins | G06Q 30/0204 705/7.33 |
| 2016/0314163 A1* | 10/2016 | Marquardt | G06F 17/30362 707/E17.032 |
| 2016/0360382 A1* | 12/2016 | Gross | G06F 3/0488 707/E17.014 |
| 2018/0027006 A1* | 1/2018 | Zimmermann | H04L 63/0245 726/11 |

* cited by examiner

ARCHIVING INDEXED DATA

TECHNICAL FIELD

The present disclosure generally relates to archiving data and searching archived data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Big data intake and search systems typically store a large amount of data received from customers' systems. The data is made available to each customer for searching and analysis. The size of the customer's stored data increases the longer the customer stays with a data intake and search system provider. Data that is stale or not immediately needed consumes space in the provider's storage devices. This can escalate the cost to the customer because the customer pays the provider for the amount of storage required to store the customer's data. A typical solution is to periodically delete the older data. Unfortunately, the deletion of older data prevents the customer from searching and analyzing historical data.

DETAILED DESCRIPTION

Figure 1:
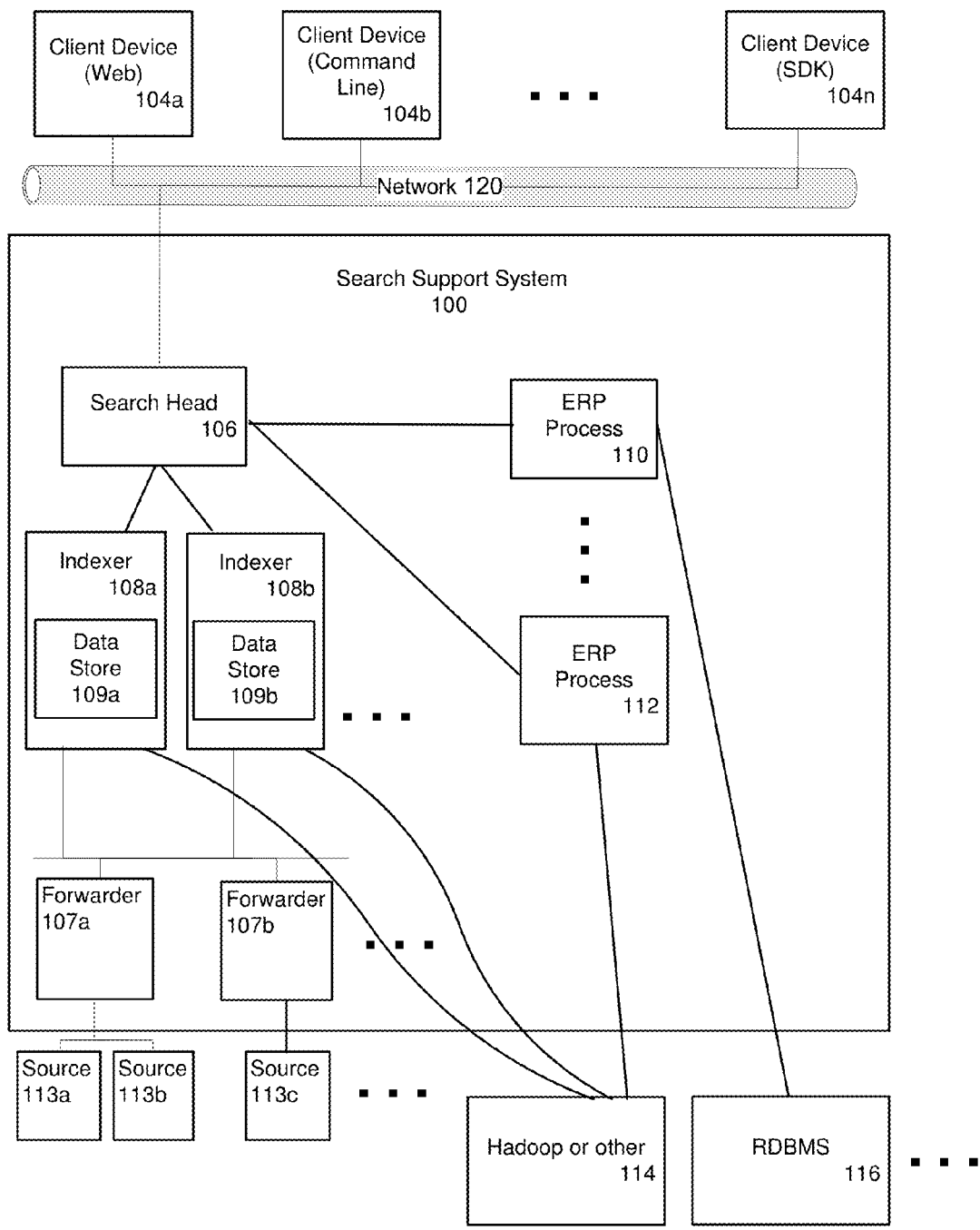
FIG. 1 is a block diagram of an example search support system, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
  1.0. General Overview
  2.0. Operating Environment
  3.0. System Operations
    3.1. Configuration Parameters
    3.2. ERP Process Features
    3.3. Data Intake
      3.3.1. Input
      3.3.2. Parsing
      3.3.3. Indexing
  4.0. Archiving Data to an External Storage System
    4.1. Searching Archived Data
  5.0. Implementation Mechanisms—Hardware Overview
  6.0. Extensions and Alternatives

1.0. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

The term "big data" is used for collections of data that are so large or complex that it is difficult to process the data using traditional data processing applications. Big data intake and search providers allow customers to gather and search their data in a manner that is faster than traditional data processing applications. A side-effect to big data is that customers have a large amount of data and thus have concerns about the cost of storing their large amounts of data in the data intake and search system. Providers of big data intake and search systems charge customers a fee for the amount of data that the systems manage.

Customers are also sensitive to being able to walk away at any time, with their data. The loss of data plays a factor on whether a customer engages a provider. If the customer loses data that is managed by a provider when the customer discontinues the provider's service, then a customer most likely will not engage the provider.

In an embodiment, a search support system autonomously archives data that has entered the system to one or more external storage providers. The system allows a customer to retrieve archived data from an external storage provider and perform searches on the data in the same manner as searching active data on the system.

In an embodiment, the search support system accepts raw data from data sources. The raw data is timestamped and parsed into searchable events. Each event contains at least a portion of the parsed raw data. The system allows customers to enter search queries that are used to search the events. Distributed servers in the system apply a late binding schema to the raw data in order to create, timestamp, and perform searches on event data according to a search query. Search results from the distributed servers are aggregated and displayed to the customer.

In an embodiment, the search support system allows a customer to specify an external storage system (virtual index) in a search query. An external storage system is a storage facility that is not part of or under control of the system. The system spawns a process that is specifically architected to communicate with the external storage system and understand data formats for data received from the external storage system. The process requests data from the external storage system and performs a search on the received data using the search query. Search results are displayed to the customer.

In an embodiment, raw data in the distributed servers is divided into groups of data called buckets. Each bucket may contain raw data that have timestamps that fall within a specific time range. When a bucket becomes inactive, e.g., no more raw data is being placed in the bucket, the server can autonomously archive the bucket to an external storage system. The data archived from the bucket may be in any form of data that is available to the server, e.g., raw data, timestamped raw data, event data, timestamped event data, etc.

In an embodiment, the search support system allows a customer to specify an external storage system containing archived data in a search query. The system can spawn a process that is architected to communicate with the external storage system and understand data formats for archived data received from the external storage system. The process requests archived data from the external storage system, processes received archived data, and performs a search on processed archived data using the search query. Search results are displayed to the customer.

Other embodiments include, without limitation, a non-transitory computer-readable medium that includes processor-executable instructions that enable a processing unit to implement one or more aspects of the disclosed methods as well as a system configured to implement one or more aspects of the disclosed methods.

2.0. Operating Environment

The data processing techniques described herein are suitable for use by systems deployed in a variety of operating environments. For example, FIG. 1 shows a block diagram of an example of a computer search support system 100 that provides the disclosed features. A search support system may be any system enabling the management, storage, and retrieval of data. In recent years, search support systems involving semi-structured or completely unstructured data have become more common. Example systems of this kind include SPLUNK® ENTERPRISE or SPLUNK® CLOUD produced by Splunk Inc. of San Francisco, Calif. Other example systems of this kind include Hadoop, Cassandra, and MongoDB. A small subset of search support systems (e.g., SPLUNK® ENTERPRISE or SPLUNK® CLOUD) that operate on unstructured data also provide a late binding schema, which imposes structure on the data at query time rather than at storage or ingestion time.

Search support system 100 includes one or more forwarders 107 that consume data from a variety of input data sources 113, and one or more indexers 108 that process and store the data in one or more data stores 108. The data may include, but is not limited to, any of: raw data, machine data, web logs, sensor data, activity logs, error logs, messages, message logs, etc. These forwarders and indexers can comprise separate computer systems, or may alternatively comprise separate processes executing on one or more computer systems. FIG. 1 illustrates that multiple indexers 108a, 108b may be provided with the search support system 100. When referenced in general, the indexers will be collectively referred to herein without their respective suffixes as indexers 108. FIG. 1 also illustrates that multiple forwarders 107a, 107b may be provided with the search support system 100. When referenced in general, the forwarders will be collectively referred to herein without their respective suffixes as forwarders 107. Additionally, FIG. 1 illustrates that multiple input data sources 113a, 113b, 113c may provide input to the search support system 100. When referenced in general, the input data sources will be collectively referred to herein without their respective suffixes as input data sources 113.

During operation, the forwarders 107 identify which indexers 108 receive data collected from a data source 113 and forward the data to the appropriate indexers. Forwarders 107 can also perform operations on the data before forwarding, including removing extraneous data, detecting timestamps in the data, performing other data transformations (e.g., parsing data, etc.), etc.

The search head 106 of the search support system receives search requests from one or more client devices 104 over network connections. Note that search support system 100 may reside in an enterprise location or in the cloud. FIG. 1 illustrates that multiple client devices 104a, 104b, . . . , 104n may communicate with the search support system 100. The multiple client devices will be collectively referred to herein without their respective suffixes as client devices 104. The client devices 104 may communicate with the search support system using a variety of connections. For example, one client device in FIG. 1 is illustrated as communicating over an Internet (Web) protocol, another client device is illustrated as communicating via a command line interface, and another client device is illustrated as communicating via a system developer kit (SDK). These illustrated communication connections, and suitable alternatives, will be known to those skilled in the art. The ellipses between the client devices indicate additional and different client devices that may be included in the system 100.

The search head 106 analyzes the received search request to identify request parameters. The search support system 100 is typically configured to interface with data collections that are maintained according to support system protocols, and are often maintained in an access scheme that is proprietary to the support system. Throughout this specification, such data collections that are "local" or "native" to the search support system are referred to as an "index" or "indices." An "indexer" is a system included in a search support system that manages one or more indices, thereby providing a search interface to access data in the index for the search support system.

If a search request received from one of the client devices 104 references an index maintained by the search support system, then the search head 106 connects to one or more system indexers 108 of the search support system 100 for the index referenced in the request parameters. That is, if the request parameters of the search request reference an index, then the search head accesses the data in the index via the indexer. The search support system 100 may include one or more indexers 108, depending on system access resources and requirements. As described further below, the indexers 108 retrieve data from their respective local data stores as specified in the search request. The indexers and their respective data stores that can comprise one or more storage devices and typically reside on the same system, though they may be connected via a local network connection. FIG. 1 shows each indexer 108a, 108b with a corresponding respective data store 109a, 109b.

If the request parameters of the received search request reference an external data collection, which is not accessible to the indexers 108 or under the management of the search support system, then the search head 106 can access the external data collection through an External Result Provider (ERP) process. Throughout this specification, an external data collection is referred to as a "virtual index" (plural, "virtual indices"). An ERP process provides an interface through which the search head 106 may access virtual indices.

Thus, a search reference to an index of the system is understood to relate to a locally stored and managed data collection, but a search reference to a virtual index is understand to relate to an externally stored and managed data collection, which the search head may access through one or more ERP processes. FIG. 1 shows two ERP processes 110, 112 that connect to respective remote (external) virtual indices, which are indicated as a Hadoop or other system 114 (e.g., Amazon S3, Amazon EMR, other Hadoop Compatible File Systems (HCFS), etc.) and a relational database management system (RDBMS) 116. Other virtual indices may include other file organizations and protocols, such as Structured Query Language (SQL) and the like. The ellipses between the ERP processes 110, 112 indicate optional additional ERP processes of the system 100. An ERP process may be a computer process that is initiated or spawned by the search head 106 and is executed by the search support system 100. Alternatively or additionally, an ERP process may be a process spawned by the search head 106 on the same or different host system as the search head 106 resides.

The search head 106 may spawn a single ERP process in response to multiple virtual indexes referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 106 determines the number of ERP processes to be initiated via the use of configuration parameters that are included in a search request message. Generally, there is a one-to-many relationship between an external results provider "family" and ERP processes, and there is also a one-to-many relationship between an ERP process and corresponding virtual indexes that are referred to in a search request. For example, using RDBMS, assume two independent instances of such a system by one vendor, such as one RDBMS for production and another RDBMS used for development. In such a situation, it is likely preferable (but optional) to use two ERP processes, to maintain the independent operation as between production and development data, but both of the ERPs will belong to the same family, because the two RDBMS system types are from the same vendor. Continuing the example, assume that three virtual indexes are defined for each of the ERP processes, with a virtual index reference indicated by "vix", the three virtual indexes are: prod_vix_1, prod_vix_2, and prod_vix_3 (in the production system) and dev_vix_1, dev_vix_2, and dev_vix_3 (in the development system). If the search request is such that a single ERP process can provide results for more than one virtual index referenced in the search request, then only one ERP process will be spawned by the search head 106. For example, if the search request is of the form:

index=dev_vix_1 OR index=dev_vix_2, then the search head will determine that the two arguments "dev_vix_1" and "dev_vix_2" involve a common virtual index, namely, "dev". The search head spawns the "dev" ERP process, and that ERP process will be asked to provide results for both referenced virtual indexes. When the search request has a different format, such as:

index=dev_vix_1 OR index=dev_vix_2 OR index=prod_vix_3, then the search head determines that the search request contains two arguments "dev_vix_1" and "dev_vix_2" with a common virtual index, namely, "dev", and the search request also contains an argument "prod_vix_3" with a "prod" virtual index. The search head will determine that two ERP processes are needed: one for the prod index and another for the dev indexes. In this way, the search head determines the number and type of ERP processes needed to satisfy the search request, and the search head can instantiate or spawn the corresponding determined ERP processes.

The ERP process 110, 112 may receive a search request from the search head 106, which may also provide request analysis such as described above. The search head may optimize the received search request for execution at the respective external virtual index. Alternatively, the ERP process may receive a search request as a result of analysis performed by the search head or by a different system process. The ERP process 110, 112 communicates with the search head 106 via conventional input/output routines (e.g., standard in/standard out). In this way, the ERP process receives the search request from a client device such that the search request may be efficiently executed at the corresponding external virtual index.

The ERP process 110, 112 may be implemented as a process of the search support system 100. Each ERP process may be provided by the search support system, or may be provided by process or application providers who are independent of the search support system 100. Each respective ERP process may include an interface application installed at a computer of the external result provider that ensures proper communication between the search support system and the external result provider. As described further below, the ERP processes 110, 112 generate appropriate search requests in the protocol and syntax of the respective virtual indices 114, 116 each of which corresponds to the search request received by the search support system 100. Upon receiving search results from their corresponding virtual indices, the respective ERP process passes the result to the search head 106, which may return the results to the search support system for processing and may then terminate operation of the respective ERP process 110, 112.

Client devices 104 may communicate with the search support system 100 through a network interface 120, e.g., one or more LANs, WANs, cellular networks, intranetworks, and/or internetworks using any of wired, wireless, terrestrial microwave, satellite links, etc., and may include the public Internet.

3.0. System Operations

Figure 2:
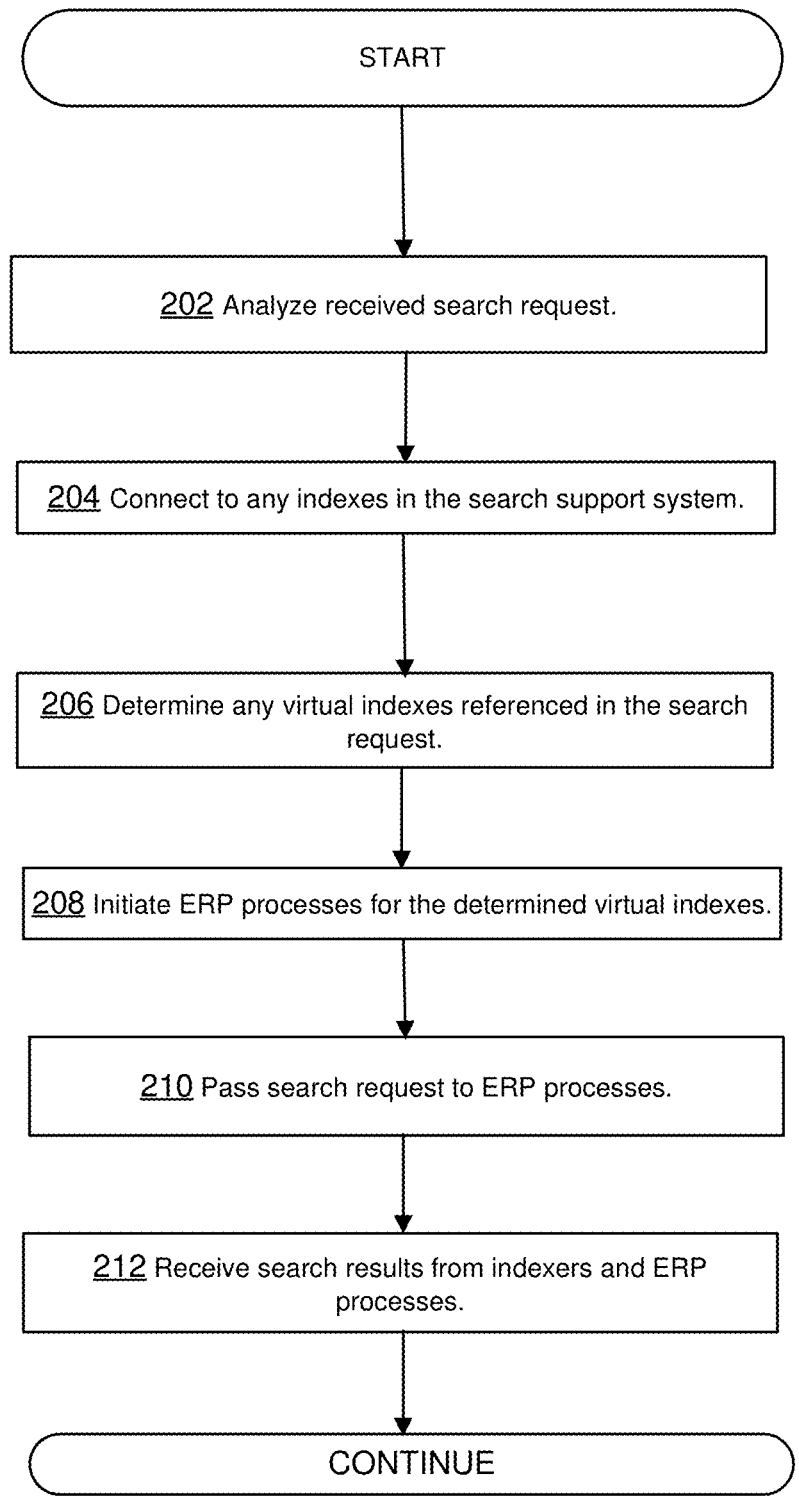
FIG. 2 illustrates an example process flow, according to an embodiment of the invention.

FIG. 2 illustrates a flow diagram of an example embodiment of the processing performed by the system. The search head receives a search request from a client device and analyzes the search request 202. The analysis includes request processing, such as protocol checking syntax checking, etc. In an embodiment, the search head parses the search request to identify all commands in the request and to identify two portions of the search request: a local portion and a remote portion. The local portion identifies the part of the search request that can be performed by the search head. The remote portion identifies the part of the search request that can be executed on the indexers or by external result providers for remote (external) data sources and corresponding ERP processes. The search head then determines all the indexers that would provide data for the non-virtual indexes referenced in the search request.

The search head connects to any local indexers (local data sources) in the search support system responsible for indexes needed to fulfill the received search request 202. The search head sends the indexers the search request or a relevant portion of the search request.

The search head determines any virtual indexes referenced in the received search request 204. Such search request references may comprise, for example, an identification of an external result provider or other third party indices from which search results are desired, such as the aforementioned Hadoop, RDBMS, and SQL. The determination of virtual indexes is a result of the search request analysis performed by the search head.

The next operation, indicated by the box 208, is for the search head to initiate an ERP process for the determined virtual indexes. As noted above, a single ERP process may be spawned or instantiated for groups of virtual indexes, or a single ERP process may be spawned for each virtual index, as determined by the search head. An ERP process may be a process that is executed in the search support system operating system environment.

The search head passes the received search request to the proper ERP processes to retrieve the desired search results 210. The search request includes operating parameters, configuration information, and arguments for proper runtime implementation. The search request is passed to an ERP process as part of the request to spawn the ERP process, in the action arguments of the search request. The search head 106 optimizes the search request for each virtual index for which the ERP process will provide results. The ERP processes 110, 112 generate a search request and pass it to a corresponding external result provider (e.g., virtual indices 114, 116) such that the search request to the external result provider corresponds to the search request passed to the indexers 108. The ERP process, however, is free to ignore the optimized search request and provide a much larger superset of the results. That is, the search head is responsible for the final filtering of the results returned by the ERP process and for guaranteeing the result set is correct.

As noted above, an ERP process can request results for more than one virtual index referenced in a search request. Because a search request can reference more than one virtual index, more than one external result provider may be spawned by a search request. A single ERP process may be given responsibility for multiple referenced indexes. In such a configuration, one ERP process is initiated by the search head for all the referenced virtual indexes for which that ERP process is responsible. Alternatively, each ERP process may be assigned responsibility for a single corresponding virtual index.

The search head 106 ultimately receives the search request results from the indexers 108, and also from the ERP processes 110, 112. This operation is indicated by the box 212 in FIG. 2. The search head receives the search results, including intermediary results that are returned with search results updated in real time and final results that comprise results of the search request after the request processing on the recited indices are completed.

3.1. Configuration Parameters

Figure 3:
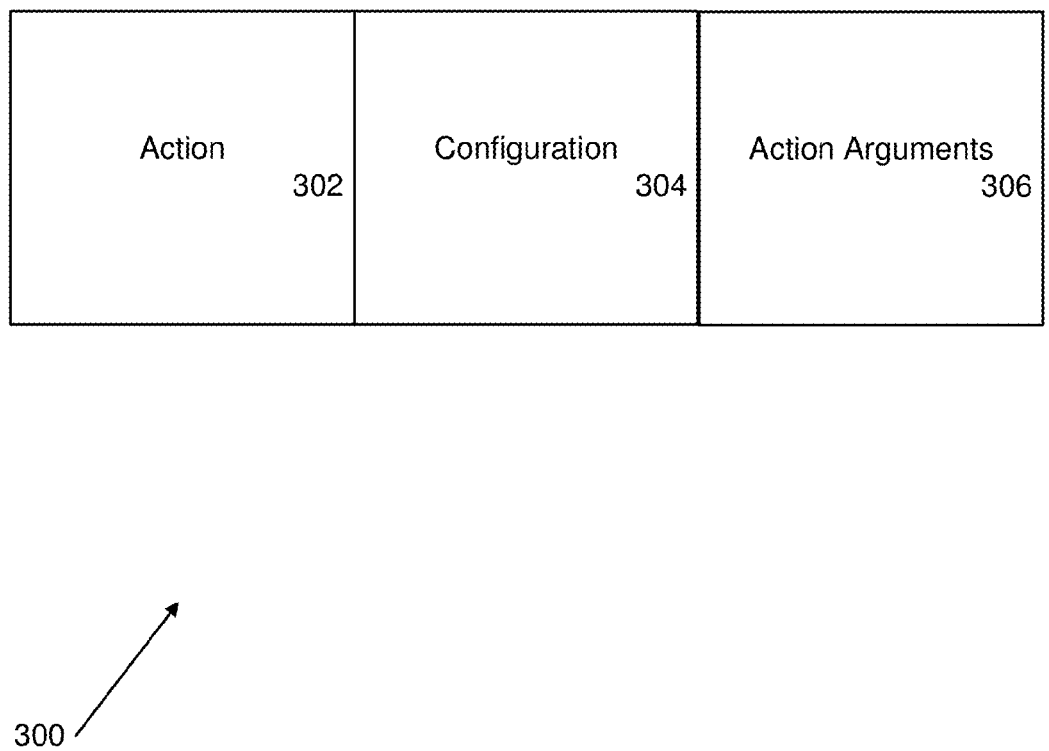
FIG. 3 is a diagrammatic representation of parameters in a search request, according to an embodiment of the invention.

FIG. 3 is a representation 300 of the parameters in a search request that is passed by the system illustrated in FIG. 1. FIG. 3 shows that the parameters in a search request include at least action information 302, configuration information 304, and action arguments 306. The particular format and content of the parameters 300 depend on the search support system 100 in use. In an embodiment, the action information comprises a search indicator, the configuration information reflects the indexer information for the system 100 (FIG. 1), and the runtime arguments include information such as a time range over which the index will be searched, text of the search string in the request, and the like.

As an example of search request processing, a search request may comprise the following text string:

index=main OR index=vix_1|stats count by index

After the search request is processed and optimized by the search head, the local portion of the search request (e.g., what is executed on the search head) comprises the portion of the search request as follows:

stats count by index and the remote portion of the search request comprises a combination of local and remote references, the remote portion of the search request as follows:

index=main|prestats count by index (remote part executed by indexers)

index=vix_1|prestats count by index (remote part executed by ERP).

In this example, the original search request string does not contain any reference to "prestats", this command is added by the search head during the analysis of the search request and is used to push down computation tasks to remote systems (indexers or ERPs).

Figure 4:
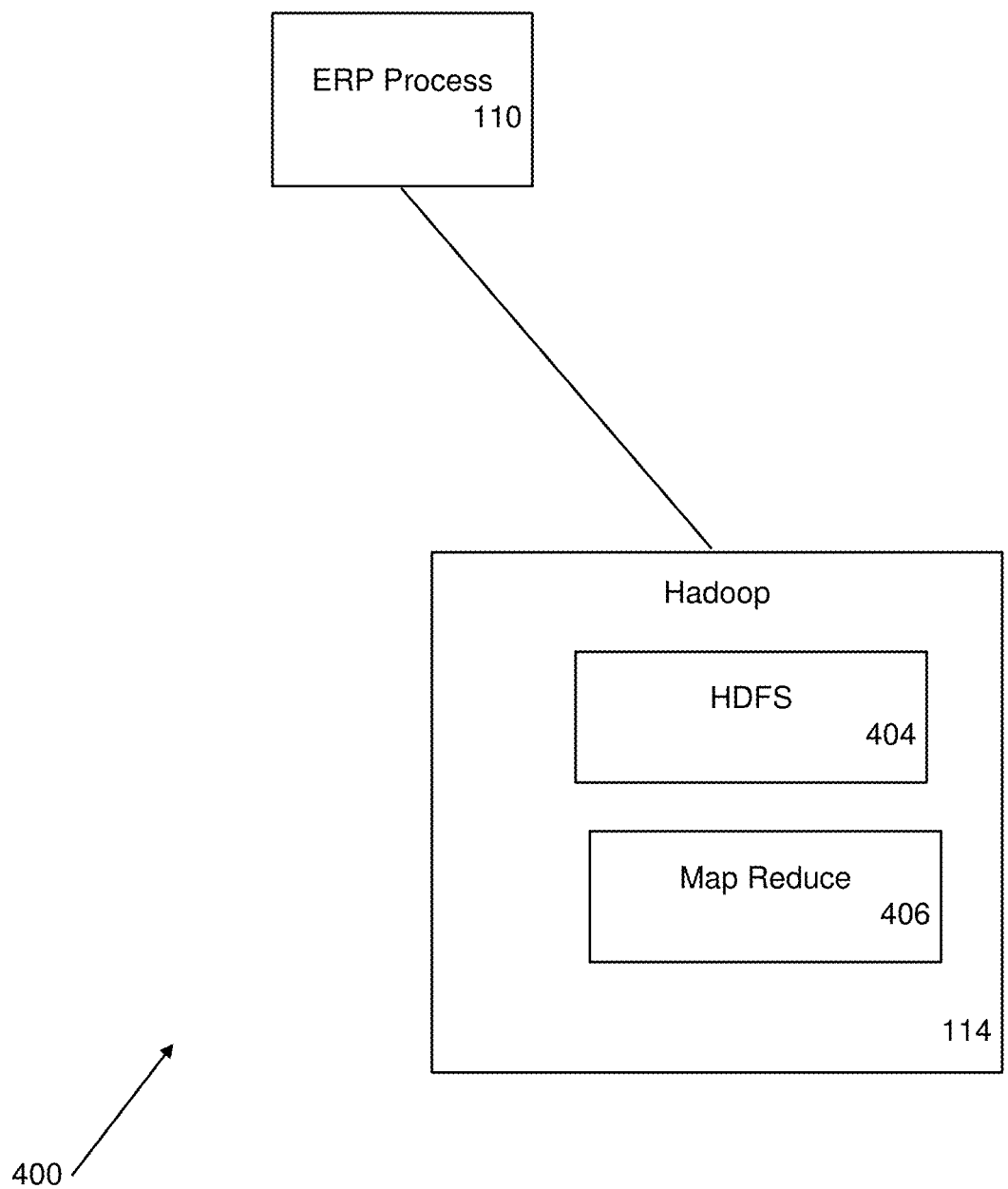
FIG. 4 is a block diagram of a system configuration for performing searches on Hadoop external sources, according to an embodiment of the invention.

FIG. 4 is a block diagram representation of details for a system configuration of an embodiment of the system for performing searches on Hadoop external sources. That is, the Hadoop system 114 provides an interface to a Hadoop-based data system. FIG. 4 shows that the Hadoop system 114 includes a Hadoop distributed file system (HDFS) component 404 and a Map Reduce component 406.

3.2. ERP Process Features

The ERP processes described above may include two operation modes, a streaming mode, and a reporting mode. The ERP processes can operate in streaming mode only, or reporting mode only, or in both modes simultaneously. Operating in both modes simultaneously is referred to as mixed mode operation. Further, it will be appreciated that in mixed mode operation, the ERP at some point can stop providing the search head with streaming results and only provide reporting results thereafter, or the search head at some point may start ignoring streaming results it has been using and only use reporting results thereafter.

The streaming mode returns search results in real time with minimal processing, in response to the search request. The reporting mode provides results of a search request with processing of the search results prior to providing them to the requesting search head, which in turn provides results to the requesting client device. ERP operation with such multiple modes provides greater flexibility in the performance of the ERP process with regard to report time, search latency, and resource utilization.

In mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim results to the user at the requesting client device, providing the streaming mode results, while the search head is simultaneously waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and start providing to the client or search requester interim results that are responsive to the query. Meanwhile, in this mixed mode, the ERP also operates concurrently in reporting mode, processing portions of raw data in a manner responsive to the search query. Upon determining that it has results from reporting mode available to return to the search head, the ERP may halt mixed mode at that time (or some later time) by stopping the return of data in streaming mode to the search head, switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation at the point where the higher bandwidth results from the reporting mode outstrips the amount of data processed by the search head in the lower bandwidth streaming mode of ERP operation.

One reason reporting mode is typically higher bandwidth is because the ERP does not have to spend time transferring data to the search head for processing all the raw data, and another reason is because the ERP may optionally direct another processor to do the processing.

One should recognize that it is not necessary to halt at any point the streaming mode of operation to gain the higher bandwidth benefits of reporting mode; the search head could simply stop using the streaming mode results—and start using the reporting mode results—at some point at which the bandwidth of the reporting mode has caught up with or exceeded the amount of bandwidth provided by the streaming mode. Thus, a variety of triggers and ways to accomplish a switch from the search head using or the ERP transferring streaming mode results to reporting mode results may occur to one skilled in the art.

The reporting mode can involve the ERP process (or an external system) performing event breaking, time stamping, filtering of events to match the search query request, and calculating statistics on the results. Whether or not events are the ultimate answer to a search query, or whether or not statistics are the ultimate answer, depends on the search query request specified by the user. The user can request particular types of data, such as where the search query itself involves types of events, or the search request may ask for statistics on data, such as on events that meet the search request; either query phrasing is possible. In either case, the search head understands the query language used in the received query request, which may be a proprietary language. For example, the search head may understand the query language used by the assignee of the application, Splunk Inc. (a query language commonly called SPL, or Splunk Processing Language) and the search head typically understands how to use that language to obtain data from the indexers which store data in a Splunk-specific format.

The ERP processes support the search head, as the search head is not ordinarily configured to understand the format in which data is stored in external data sources such as Hadoop or SQL data systems. Rather, the ERP process performs that translation from the format for what has been requested by the search query that has been submitted in the search support system's native format (e.g., SPL if SPLUNK® ENTERPRISE is used as the search support system) to the format in which a search query request will be accepted by the corresponding external data system. The external data systems typically store data in a different format from that of the search support system's native index format, and utilize a different query language (e.g., SQL or MapReduce, rather than SPL or the like).

As noted, the ERP process can operate in the streaming mode alone. After the ERP process has performed the translation of the query request referred to above, and once the ERP process has returned the raw results from the streaming mode, the search head can operate on the returned data and can integrate the returned data with any data obtained from local data sources (e.g., native to the search support system) and from other external data sources and from other ERP processes (if such operations were required to satisfy the terms of the search query). Thus, one advantage of mixed mode operation is that, in addition to streaming mode, the ERP process is also executing concurrently in the reporting mode, so that the ERP process (rather than the search head) is processing query results (e.g., performing event breaking, timestamping, filtering, possibly calculating statistics if required to be responsive to the search query request, etc.). It should be apparent that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can start returning meaningful results from its reporting mode.

The operation described above illustrates the source of operational latency: streaming mode has low latency (one obtains immediate results) and usually has relatively low bandwidth (fewer results can be returned per unit of time), whereas the concurrently running reporting mode has relatively high latency (it has to perform a lot more processing before returning any of the results) and usually has relatively high bandwidth (more results can be processed per unit of time). For example, when the ERP process does start returning report results, it returns a more (processed) results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request (which may have requested certain types of events, or statistics on those events). Alternatively, the ERP process can be configured to operate in the reporting mode only. Also alternatively, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results, rather, the reporting mode usually performs processing of chunks of events at a time and returns the processing results to the search head for each chunk.

For example, an ERP process can be configured to perform as simply as returning the contents of a search result file verbatim, with little or no processing of results, such that a search head performs all processing such as breaking byte streams to events, filtering, and the like, or the ERP process can be configured to perform more flexibly, such as analyzing the search request and handling all the computation that a native search indexer process would otherwise perform. In this way, the configured ERP process provides greater flexibility in features while operating according to desired preferences in terms of response latency and resource requirements.

Figure 5:
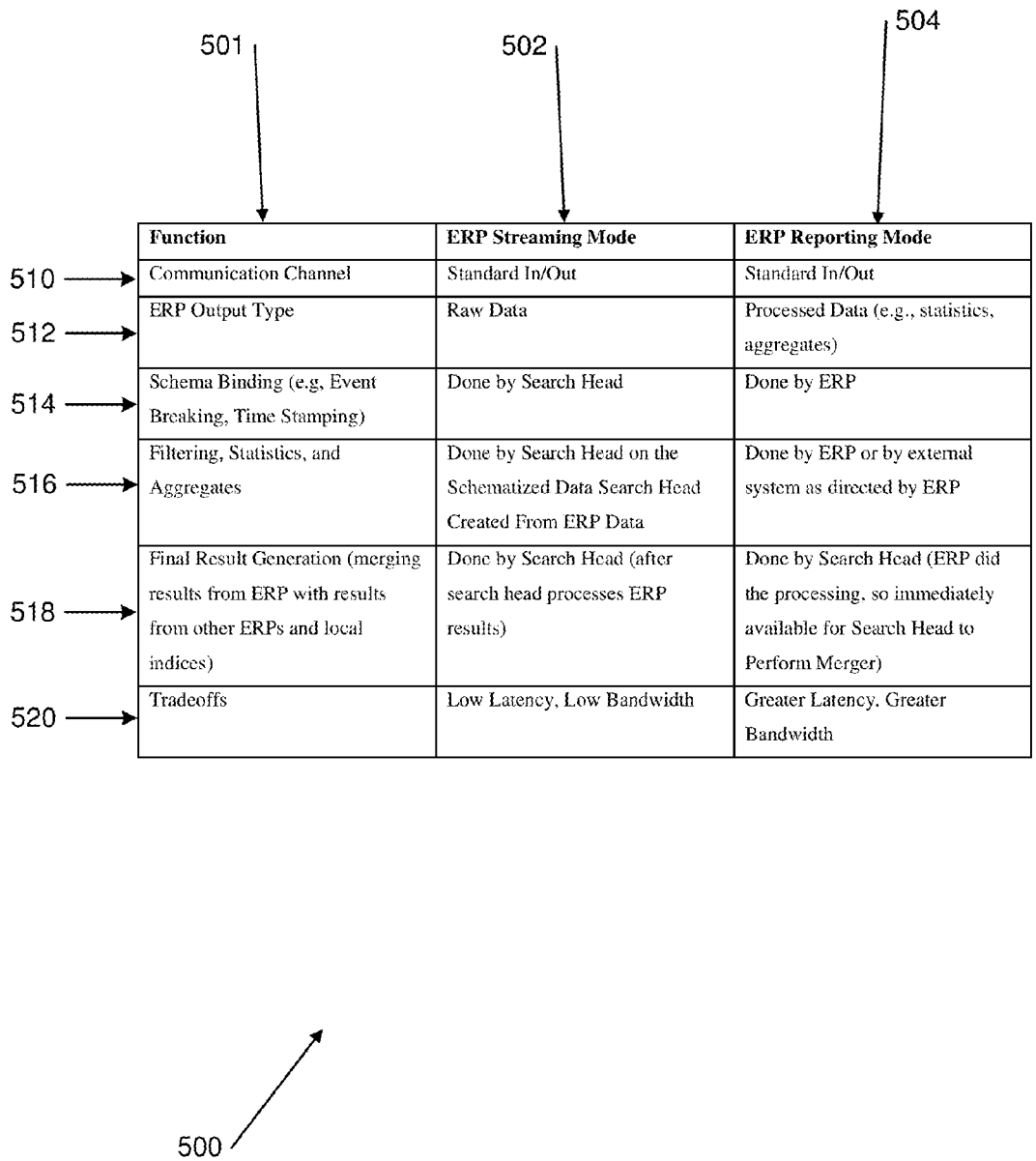
FIG. 5 is a representation of operating mode features available in ERP processes, according to an embodiment of the invention.

FIG. 5 is a representation of operating mode features available in the ERP processes illustrated in FIG. 1. FIG. 5 shows a table 500 with three columns, a left-most column 501 indicating what each row shows, column 502 that shows operating features available with the streaming mode of the ERP process, and a column 504 that shows operating features available with the reporting mode of the ERP process.

Row 510 of table 500 identifies the communication channel for the two modes. In this example, both modes are identified as providing standard, conventional communication routines for receiving and/or transmitting messages. Row 512 identifies an ERP output type. In streaming mode, the output includes raw data. For example, an ERP process operating on external data source with a flat text file in the streaming mode would return the actual text data from the data source that is received from the source in response to the search request, with little or no processing. In reporting mode, the output includes processed data (e.g., including statistics or determinations of received data in accordance with the search request). For example, the ERP process can identify subdivisions in the received data and can determine data value frequencies of occurrence in the received data. Such processed data can be presented in a report format according to parameters of the search support system or according to the search request.

Row 514 identifies which component performs schema binding, which can include, e.g., breaking a received byte stream into events or records and/or extracting a time stamp. In the ERP streaming mode, schema binding is performed by the search head. Meanwhile, in the ERP reporting mode, schema binding is performed by the ERP. Row 516 identifies which component performs processing, such as filtering, statistics and/or aggregation. In streaming mode, the processing is performed by the search head. Specifically, the search head takes the raw data from the ERP, schematizes it, and then performs processing on it. In reporting mode, processing is performed by the ERP or by an external system that is directed and/or controlled by the ERP.

Row 518 identifies which component generates a final search result. The generation can include, e.g., merging results from the ERP with results from other ERPs and/or with results from data stores. In both modes, the final result generation is performed by the search head. In streaming mode, it is performed after the search head processes results from the ERP. In reporting mode, the generation can be immediately performed upon receiving the processed results, as the ERP performed the processing. Row 520 identifies the tradeoffs for the respective modes. As shown, the reporting mode results in greater latency and bandwidth relative to the streaming mode. It will be appreciated that the modes can be operated concurrently, though it is generally more difficult to program a mixed-mode ERP process. For example, streaming mode operation is relatively easy to configure, and the ERP process can be configured to operate that mode only.

It should be noted that in the streaming mode, the ERP returns raw data to the search head in a continuous manner (e.g., returns the contents of a file—raw data—as it is retrieved), whereas in the reporting mode, the ERP returns processed data (e.g., filtered results, aggregates and/or statistics determined by processing the raw data, etc.) as portions of the data are processed by the ERP or under the direction of the ERP, though the time required to process a block of raw data in reporting mode will typically mean that the ERP first starts returning results in reporting mode after it has started to return raw data in streaming mode. It should be noted that an ERP process that can operate in the reporting mode should also be able to operate in the streaming mode so that if the user specifies a search that requires no processing, the data can be provided by the ERP.

As mentioned, the ERP provides the results it generates to the search head. The search head operates on the output of the streaming mode, as well as of the reporting mode, and integrates the information with data responsive to the search request from any local data stores and from other virtual indices as provided by other ERP processes. As noted though, before integration, in results provided by an ERP in streaming mode, if the data provided is unstructured, then the search process needs to first bind a schema to the data to extract valuable information from that data to provide fields on which that data can be operated on and/or searched by the search head; example schema binding may include breaking the raw data up into separate events and/or extracting time stamps from the events.

Because a search support system with a late binding schema can use ERPs to access unstructured and/or structured data from virtual indices and then also make that data searchable in the same way it makes its locally indexed data searchable, ERPs are especially useful in such systems. If the search support system were not late binding or could not deal with unstructured data, it might be difficult to access and make use of unstructured data from a virtual index.

Figure 6:
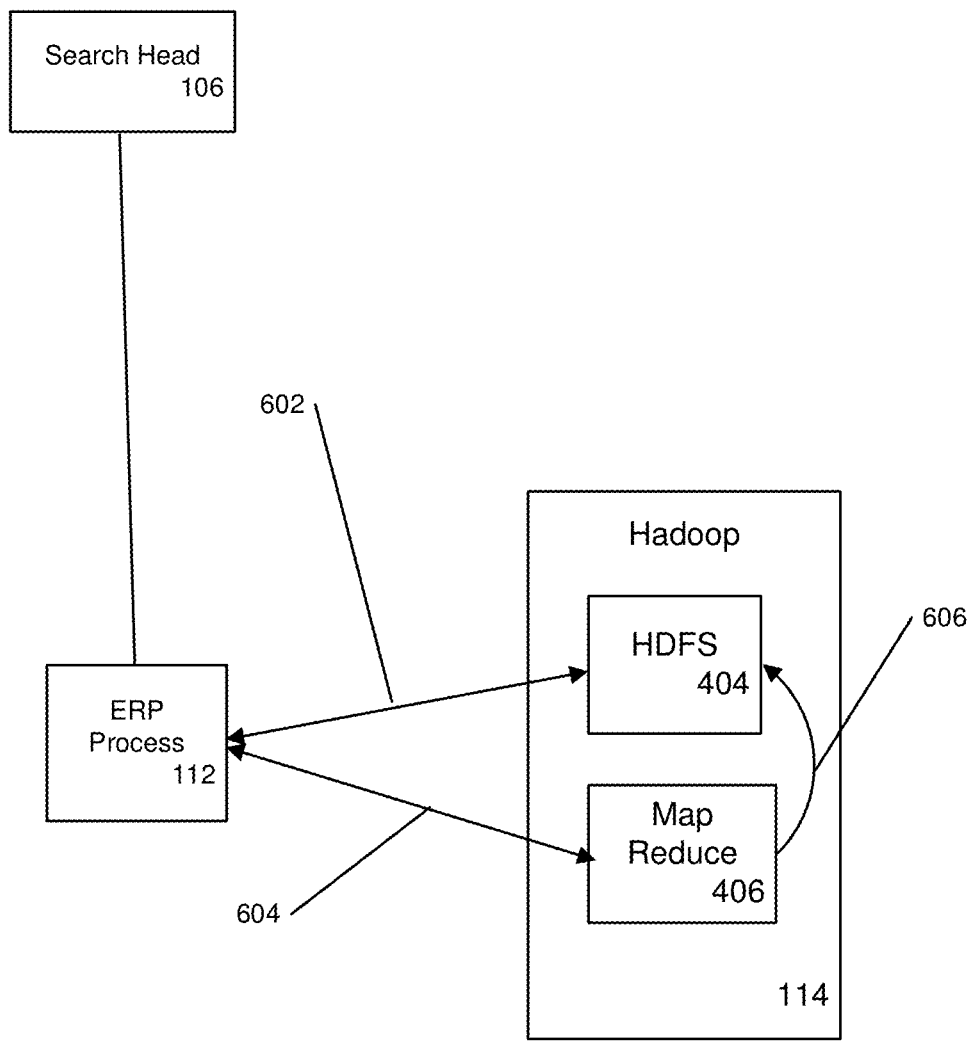
FIG. 6 is a block diagram showing details of an ERP process for search request processing of a Hadoop data source, according to an embodiment of the invention.

FIG. 6 is an example of details for ERP processing as applied to a Hadoop virtual index. FIG. 6 shows some details from FIG. 1. In FIG. 6, the ERP process 112 is shown communicating with the HDFS 404 of the Hadoop system 114, with the double-ending arrow 602 representing the communication that occurs between the ERP process and the HDFS. The arrow 604 represents the search request being submitted to the Map Reduce block 406, and the curved arrow 606 represents the search results being communicated to the HDFS for output.

An example of Hadoop processing involves a user search request to generate a report based on a number of files residing in an HDFS data system. Thus, the search support system uses a virtual index (e.g., the HDFS system) that contains all the requested files, and the ERP process has been correctly configured with parameters or configurations such as host, port, credential information, etc. Assuming the ERP process for Hadoop is a reporting ERP which can also operate in mixed mode (e.g., operating in streaming and reporting mode), upon receiving a search request, the ERP process operates as follows:

(a) the ERP process starts operation in streaming mode, streaming files responsive to the query to the search head;

(b) concurrently with (a), the ERP process starts executing a MapReduce job (made up of many tasks) to create reports for the files in the Hadoop system;

(c) at a later time, the ERP process stops operating in the streaming mode as soon as the first MapReduce task completes, that is, the ERP process switches from streaming mode to reporting mode in response to completion of the first MapReduce task.

Thus, the reporting mode operation supports returning of results after completion of each MapReduce task. The reporting mode is continuous and doesn't wait until complete processing of all of the data in the external data source has occurred before returning results to the search support system, but it often doesn't return results as quickly as the streaming mode does.

Figure 7:
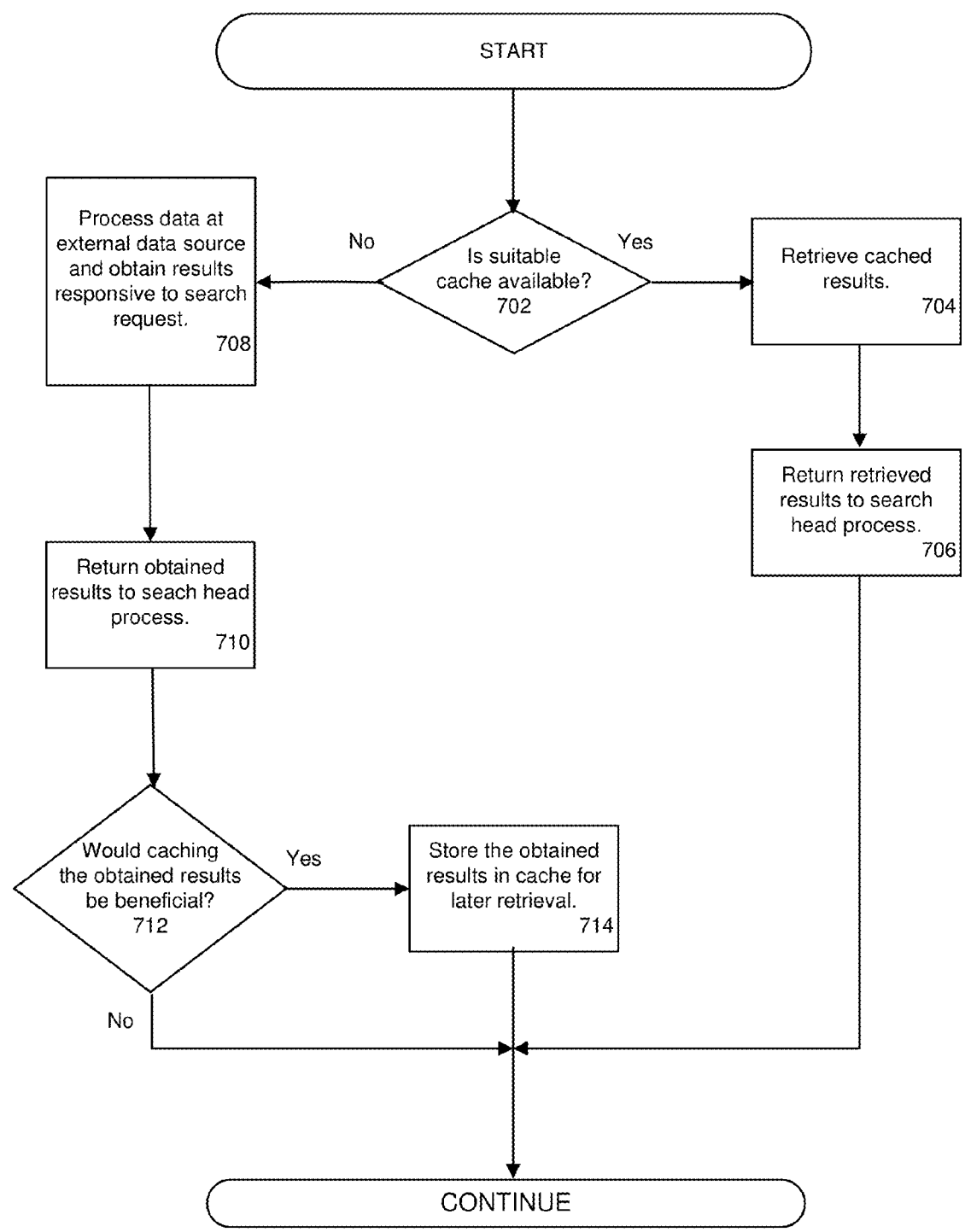
FIG. 7 is a flow diagram of an example of processing performed by an ERP process, according to an embodiment of the invention.

FIG. 7 is a flow diagram of an example of the processing performed by an ERP process. FIG. 7 shows that caching operations may be supported by the FIG. 1 system, regardless of whether the ERP operates in streaming mode, reporting mode, or mixed mode. Examples of methods to cache data in response to search queries are discussed in U.S. Pat. No. 8,682,886, entitled "Report Acceleration Using Intermediate Summaries of Events," assigned to the assignee of the current application. The contents of the U.S. Pat. No. 8,682,886 are hereby incorporated by reference in their entireties for all purposes. Referring again to FIG. 7, the ERP process determines if cached results for the received query are available 702. Such determination occurs prior to the ERP processing any chunk of events or other data from the external data source. The determination by the ERP processor of available cached results may be determined by considering the events being processed and the search being executed.

In the case of cached results being available, an affirmative outcome at 702, the ERP process retrieves the cached results, as indicated at 704. The ERP process then returns the retrieved results from the cache to the search head 706. The ERP process then continues with subsequent retrieval of remaining data for which the cache contains no results.

In the case of no cached results available, a negative outcome at 702, the ERP process then processes the data in the external data source, data typically comprising events, as indicated at 708. The processing comprises executing the received search query on the external data source. The ERP process then returns the results obtained from the processing to the search head, as indicated at 710.

After executing the received search query, the ERP process determines if caching the obtained results from processing the data according to the search query 708 would be beneficial. This decision, indicated by 712, is based on considerations such as the amount of time spent generating the obtained results, the size of the results as compared to the input events, and the frequency of the search query (including, for example, if some or any of these exceed thresholds). It should be noted that the ERP process has access to such computed and accumulated data and statistics. Other ways to determine whether caching search results is beneficial are explored in the aforementioned U.S. patent application Ser. No. 13/664,231, entitled "Transparent Index Summarization," assigned to the assignee of the current application.

If the ERP process determines that it would be of no benefit to cache the results, a negative outcome at 712, then the ERP process then continues with subsequent processing. If the ERP process determines that it would be beneficial to cache the results, an affirmative outcome at the box 712, then the ERP process stores the obtained results in cache for later retrieval, as indicated by the box 714. The cache may be maintained in either the search support system, connected storage, or in the external data sources, such that the cache will be accessible to operations at the decision box 702, that is, to be accessible to the ERP processes of the search support system.

3.3. Data Intake

Figure 8:
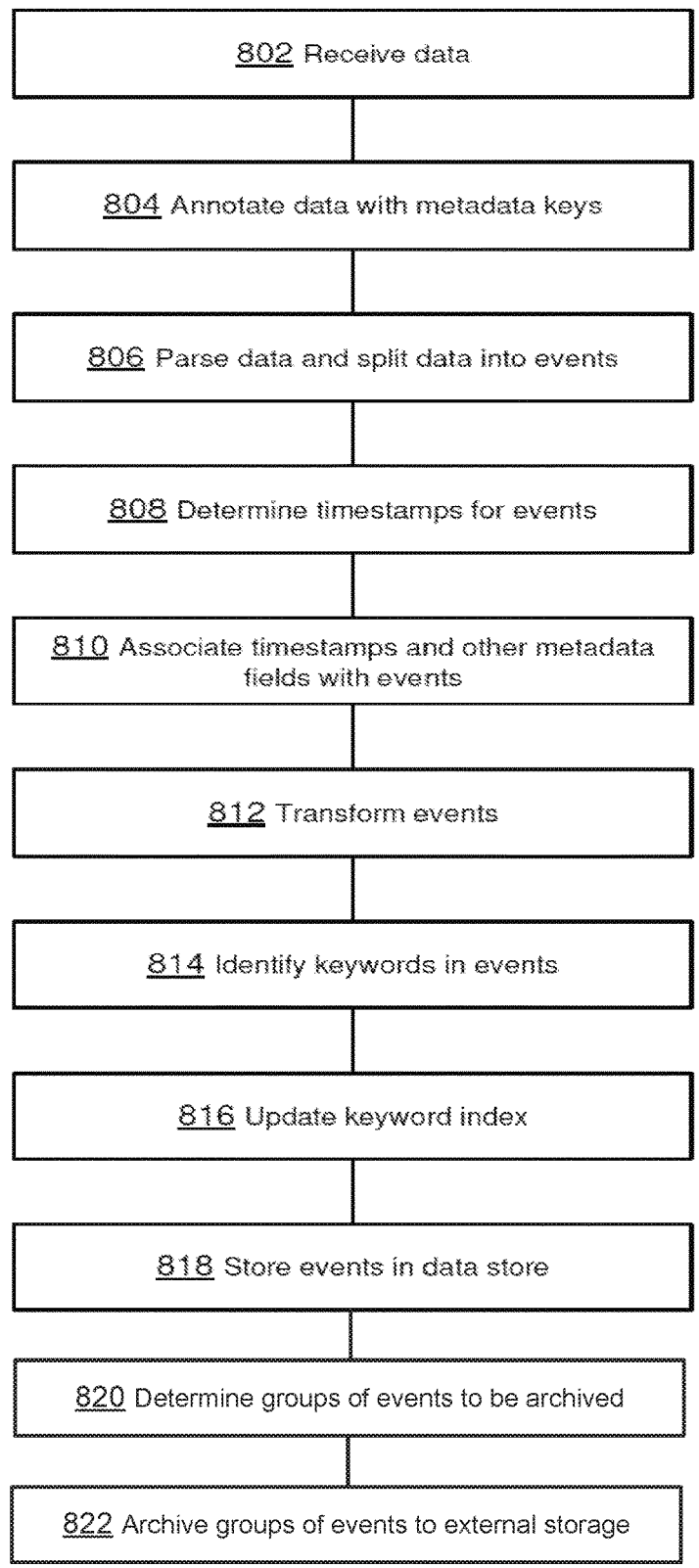
FIG. 8 illustrates an example process flow for data intake, according to an embodiment of the invention.

FIG. 8 depicts a flow chart illustrating an example data flow within search support system 100, in accordance with the disclosed embodiments. The data flow illustrated in FIG. 8 is provided for illustrative purposes only; one or more of the steps of the processes illustrated in FIG. 8 may be removed or the ordering of the steps may be changed. Furthermore, for the purposes of illustrating a clear example, one or more particular system components is described as performing various operations during each of the data flow stages. For example, a forwarder 107 is described as receiving and processing data during an input phase, an indexer 108 is described as parsing and indexing data during parsing and indexing phases, and a search head 106 is described as performing a search query during a search phase. However, it is noted that other system arrangements and distributions of the processing steps across system components may be used.

3.3.1. Input

At block 802, a forwarder 107 receives data from an input source 113. A forwarder, for example, initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks," possibly of a uniform data size, to facilitate subsequent processing steps.

At block 804, a forwarder or other system component annotates each block generated from the raw data with one or more metadata fields. These metadata fields may, for example, provide information related to the data block as a whole and which apply to each event that is subsequently derived from the data block, as described in more detail below. For example, the metadata fields may include separate fields specifying each of a host, a source, and a source type related to the data block. A host field, for example, may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data if known, and possibly other values that provide information relevant to later processing steps. In an embodiment, a forwarder forwards the data to another system component for further processing, typically forwarding the annotated data blocks to an indexer.

3.3.2. Parsing

At block 806, an indexer 108 receives data blocks from a forwarder 107 and parses the data to organize the data into events. In an embodiment, to organize the data into events, an indexer may determine a source type associated with each data block (e.g., by extracting a source type label from the metadata fields associated with the data block) and refer to a source type configuration corresponding to the identified source type. The source type definition may include one or more properties that indicate to the indexer what are the boundaries of events in the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, or line breaks. If a source type for the data is unknown to the indexer, an indexer may infer a source type for the data by examining the structure of the data and apply an inferred source type definition to the data to create the events.

At block 808, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, or based on any other rules for determining timestamps.

At block 810, the indexer associates with each event one or more metadata fields including a field containing the timestamp determined for the event. These metadata fields may include a number of "default fields" that are associated with all events, and may also include one more custom fields as defined by a user. Similar to the metadata fields associated with the data blocks at block 804, the default metadata fields associated with each event may include a host, source, and source type field in addition to a field storing the timestamp.

At block 812, an indexer may optionally apply one or more transformations to data included in the events created at block 806. For example, such transformations can include removing a portion of an event (e.g., a portion used to define event boundaries, other extraneous text, etc.), masking a portion of an event (e.g., masking a credit card number), or removing redundant portions of an event. The transformations applied to event data may, for example, be specified in one or more configuration files and referenced by one or more source type definitions.

3.3.3. Indexing

At blocks 814 and 816, an indexer can optionally generate a keyword index to facilitate fast keyword searching for event data. To build a keyword index, at block 814, the indexer identifies a set of keywords in each event. At block 816, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 818, the indexer stores the events in a data store, where a timestamp can be stored with each event to facilitate searching for events based on a time range. In one embodiment, the stored events are organized into "buckets," where each bucket stores events associated with a specific time range based on the timestamps associated with each event. This may not only improve time-based searching, but also allow for events with recent timestamps, which may have a higher likelihood of being accessed, to be stored in faster memory to facilitate faster retrieval. For example, buckets containing the most recent events can be stored as flash memory instead of on hard disk. At block 820, the indexer determines that one or more groups of events (buckets) stored to the data store are to be archived. At block 822, in response to determining that the one or more groups of events are to be archived, the indexer archives the one or more groups of events by sending data associated with the one or more groups of events to an external storage system that is external to the data store.

Each indexer 108 may be responsible for storing and searching a subset of the events contained in a corresponding data store 109. By distributing events among the indexers and data stores, the indexers can analyze events for a query in parallel, for example, using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812, filed on 30 Apr. 2014, and in U.S. patent application Ser. No. 14/266,817, also filed on 30 Apr. 2014, each of which is hereby incorporated by reference in its entirety for all purposes.

4.0 Archiving Data to an External Storage System

As noted above, the cost of storing a customer's data on an indexer can be expensive for the customer because storage space in the data stores 109 is limited. Each indexer has the ability to manage the data stored in its associated data store. Buckets stored in the data stores by the indexers 108 can be classified into four categories: hot, warm, cold, and frozen. In general, hot buckets are the buckets that are active, where data is being received from data sources and placed into the bucket. Warm buckets are buckets where data is no longer being added, but the bucket is desired to be on faster storage available to the indexer. A cold bucket is a bucket where data is no longer being added and the bucket is being stored in the data store. A frozen bucket is a cold bucket that has reached a certain age, or where the maximum number of buckets has been reached and the cold bucket is the oldest bucket, or where the maximum amount of memory space consumed by the buckets is exceeded and the cold bucket is the oldest bucket. Frozen buckets may be deleted if archiving is not available. In an embodiment, the four levels are user-definable. In an embodiment, any number of categories may be defined.

Figure 9:
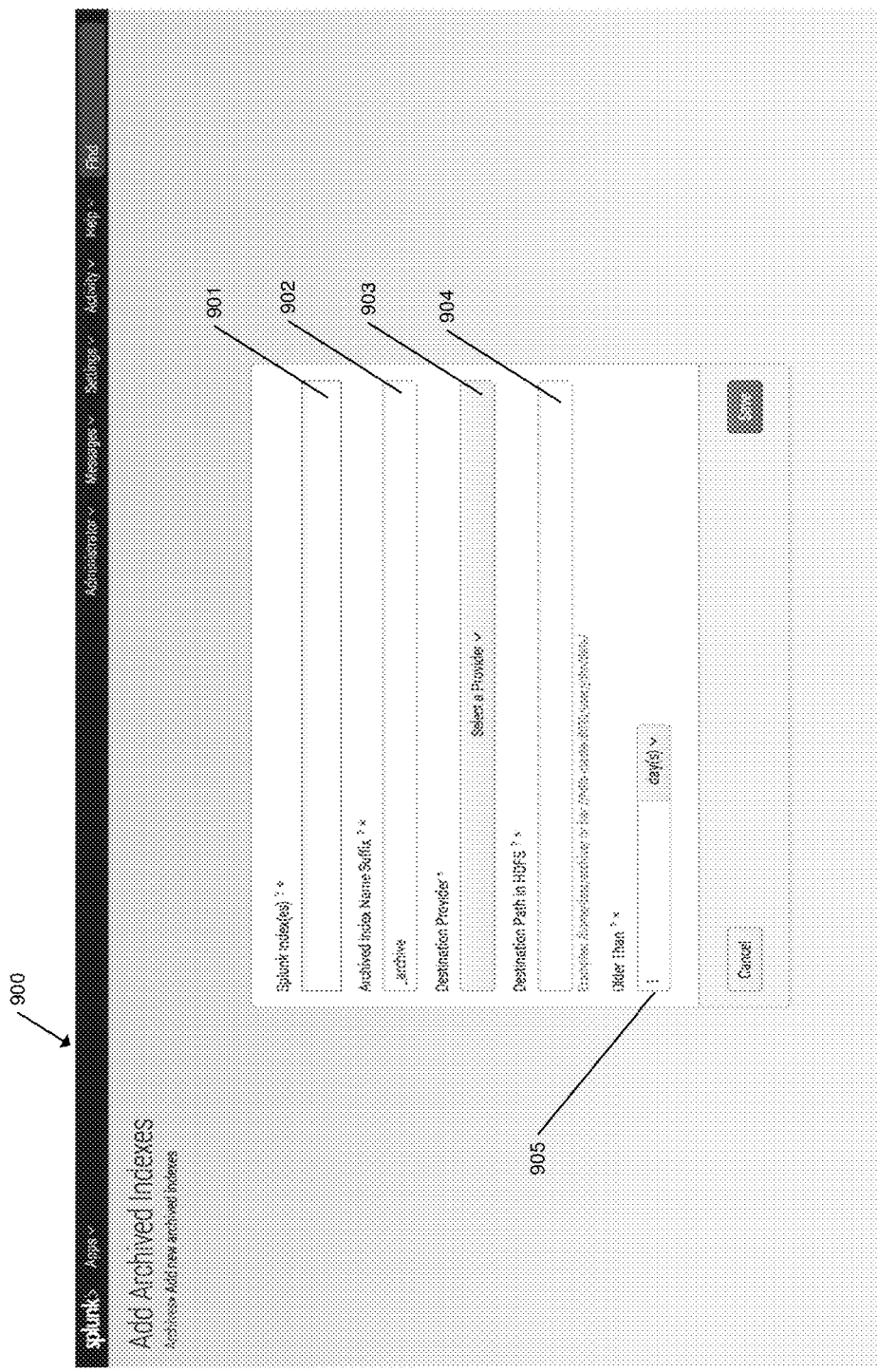
FIG. 9 illustrates a graphical user interface for adding archived indexes, according to an embodiment of the invention.

Customers would prefer to archive their data in a lower cost, redundant data storage system rather than keeping their data stored on the data stores associated with the indexers. Data in data stores cannot be stored indefinitely or the indexers would have no room for new data. Data must either be archived or deleted in a timely manner. In FIG. 9, the system (in some embodiments the search head) generates and causes the display of a graphical user interface 900 that allows a customer to specify the name of one or more archived indexes 901, the suffix of the names of the archived indexes (in this example "_archive") 902, the provider of the external storage service 903, and the destination path in the HDFS at the provider's site 904. Note that the HDFS is an example and the destination path may be to any type of external storage system, including, but not limited to, any of: Amazon S3, Amazon EMR, other Hadoop Compatible File Systems (HCFS), etc. The user may also configure the time span in which the indexer is to send the buckets to the HDFS upon reaching the warm state 905. In this example, the time span is older than 1 day, however, any time increment (e.g., immediately, seconds, minutes, hours, days, weeks, months, years, day of the month, time of day, etc.) may be entered. In an embodiment, the customer may configure any bucket state or age upon which the indexer is to send the buckets to the HDFS for archiving.

In an embodiment, the bucket data that the indexer sends to the HDFS may contain any form of data that is available to the indexer, e.g., raw data, timestamped raw data, event data, timestamped event data, etc. In another embodiment, the bucket data may be stored in a compressed file format, e.g., a concatenated journal gzip data file, etc. In yet another embodiment, along with the bucket that is being archived, metadata may be included that indicates the earliest time and latest time associated with the events in the raw data in the bucket. This allows the system to use that information to narrow searches to relevant buckets rather than searching through the entire virtual index when the customer requests a search of the archived data (discussed below).

In an embodiment, in a redundant indexer implementation where buckets of data may be duplicated across more than one indexer, to prevent duplicating archived data, the indexer that is designated as the primary indexer for the bucket may perform the archiving process. In another embodiment, in a redundant indexer implementation, the indexer that performs the archiving process may be elected by the forwarder to perform the archiving process. In yet another embodiment, in a redundant indexer implementation, to prevent duplicating archived data, the indexer that performs the archiving process may be specified by the customer to perform the archiving process.

In an embodiment, warm buckets are archived to an external storage system 114, 116 as soon as possible by indexers. The timing may depend on the system settings or the customer's defined settings, as discussed above. For example, the default system setting may be that when a bucket meets the warm bucket criteria, the bucket is archived to an external storage system immediately or the archive process is started upon transition to the warm bucket state. When an indexer finds that a bucket has met the warm criteria, it starts to transfer the data in the bucket to an external storage system. This approach allows the indexer to delete cold and/or frozen files whenever it is convenient for the indexer without the customer losing any data. In this example, the external storage system 114 is a Hadoop system. The indexer sends data directly to the Hadoop system 114 using the HDFS destination path defined by the customer. Here, the indexer sends the raw data from a bucket that has been compressed into an encoded journal file to the HDFS using the HDFS destination path. The encoded journal file may contain data files, some of which may contain metadata regarding data in the bucket, e.g., index, sources, source types, etc.

Figure 10:
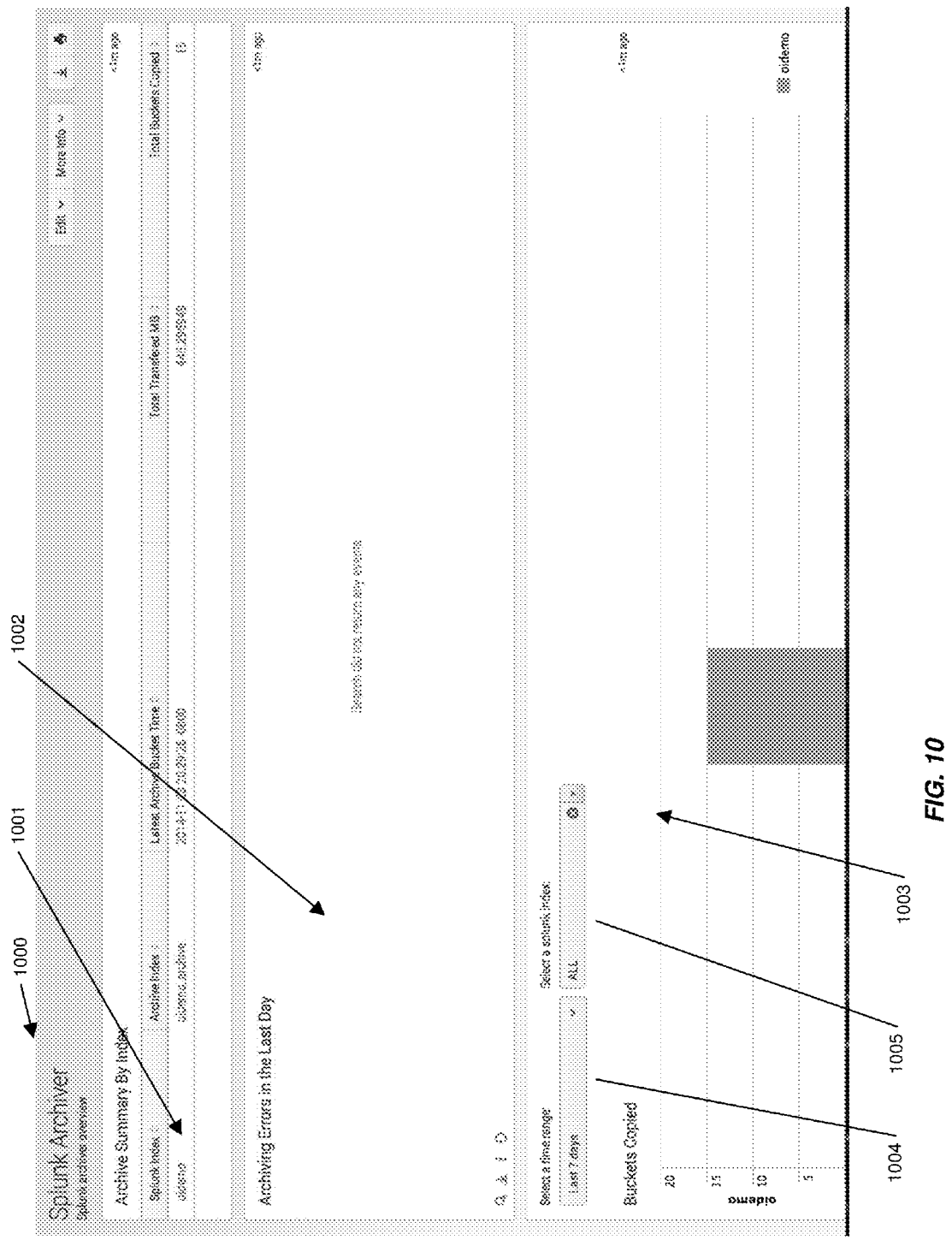
FIG. 10 illustrates a graphical user interface for archived bucket transfer counts, according to an embodiment of the invention.
Figure 11:
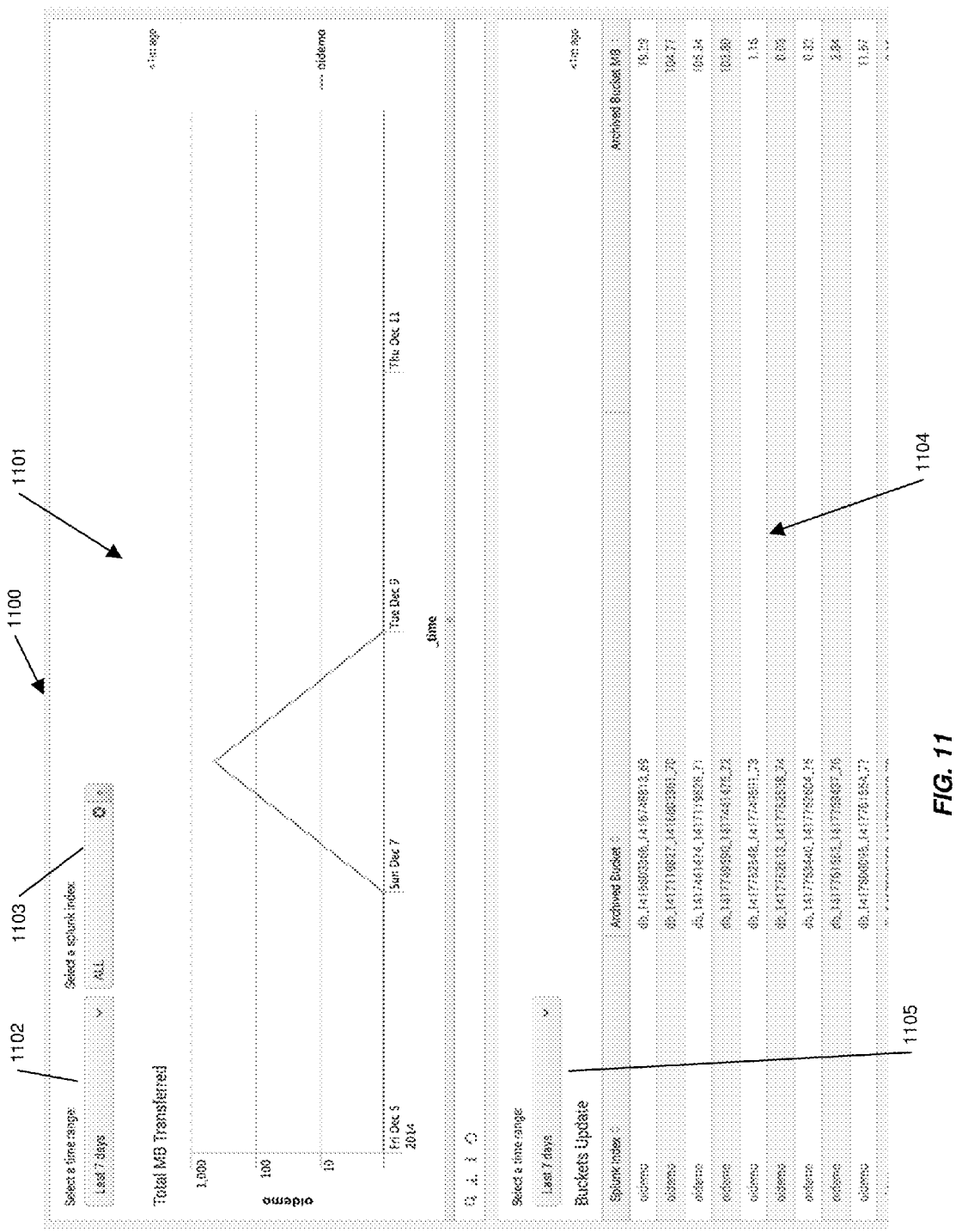
FIG. 11 illustrates a graphical user interface for archived data transfer totals, according to an embodiment of the invention.

As shown in FIGS. 10 and 11, the search support system (in some embodiments the search head) generates and causes the display of a graphical user interface 1000 that allows the customer to monitor the archiving activity for one or more indexes. Here, a summary for the activity for oidemo_archive is displayed 1001 that shows the total amount of data transferred and the total number of buckets transferred. In an embodiment, the summary may be adjusted by the customer to display activity for a certain time frame. Errors that occur during the archiving process may be displayed as well 1002. In an embodiment, the time frame used for error calculations may be specified by the customer. A graphical representation of a timeline showing the number of buckets that have been archived may also be displayed 1003. Pulldown menus are displayed that allow the customer to specify the length of the timeline 1004 and the index or indexes for which the bucket count is to be displayed 1005.

A graphical user interface 1100 allows the customer to monitor the amount of data transferred during archiving for one or more indexes. A graphical representation of a timeline showing the total amount of data archived during periods in the timeframe may be displayed 1101. Pulldown menus are displayed that allow the customer to specify the length of the timeline 1102 and the index or indexes for which the archived amounts are to be displayed 1103. A listing of individual buckets that have been archived may be displayed along with the total amount of data that was archived for that bucket 1104. A pulldown menu 1105 allows the customer to specify the time range for the listing.

Figure 12:
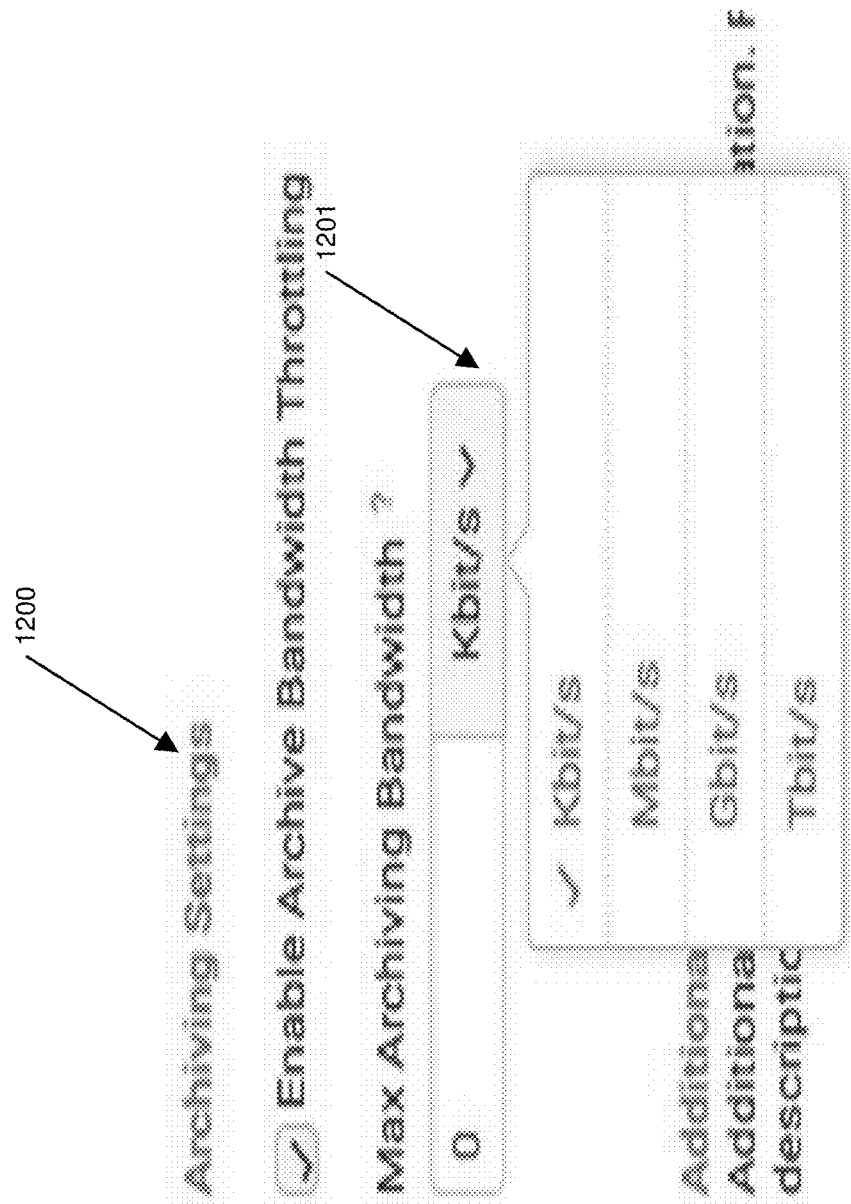
FIG. 12 illustrates a graphical user interface for setting maximum archive bandwidth limits, according to an embodiment of the invention.

As shown in FIG. 12, in an embodiment, the search support system (in some embodiments the search head) generates and causes the display of a graphical user interface 1200 that allows the customer to limit the bandwidth used by each indexer during the archiving process. In an embodiment, the customer may enable the system to use a maximum archive bandwidth. A combo box 1201 is used to specify the type of units (e.g., Kilobits per second, Megabits per second, Gigabits per second, Terrabits per second, etc.) and the number of those units to use as the maximum archive bandwidth for the provider. The specified maximum archive bandwidth is communicated to all of the indexers involved with archiving to a specified provider. Because of the possibly high bandwidth required by an indexer to archive a large amount of data in a bucket, the maximum archive bandwidth may need to be specified by the customer in order to prevent overloading of the communication paths used by the indexers. In an embodiment, the maximum archive bandwidth may apply to the maximum burst bandwidth for an indexer. In an embodiment, the maximum archive bandwidth may apply to the maximum bandwidth used by an indexer over a certain amount of time. In an embodiment, the customer may specify a time of day, day of week, day of month, etc., that the specified maximum archive bandwidth is active. In another embodiment, the customer may alternatively or additionally specify a total maximum archive bandwidth that all indexers handling the customer's data must not exceed in total. In an example, an indexer may lower the data rate that it is sending data to be archived to an external storage provider to meet the specified maximum archive bandwidth. In another example, an indexer may stop sending data to be archived for a period of time to meet the specified maximum archive bandwidth.

In an embodiment, a search command may be entered into the search head by a customer that manually designates a bucket to be archived to an external storage provider. This allows the customer to archive individual buckets on demand.

4.1. Searching Archived Data

The customer may want to search data archived with an external storage provider. The system allows a customer/user to search archived data stored with an external storage provider in the same manner as a virtual index described above. The customer specifies the external storage provider in the virtual index field of the search query. The search head is aware of the external storage provider as long as the customer has entered the archived index information as discussed above. The ERP has the ability to recognize and read the data stored with the external storage provider.

Using the example above, the customer can enter a search query for a specified timeframe along with the archive index name. The search head examines the search query and finds the HDFS destination path for the archive index name. One or more ERPs may be spawned to handle the query. An ERP among the one or more ERPs can communicate with the HDFS and search the archived index for buckets that fall within the timeframe specified by the search query. It can retrieve the buckets from the HDFS and has the logic to decompress the concatenated journal gzip files that contain the buckets. The ERP can then perform a map function on the buckets to find the events that fulfill the search query.

In this example, the buckets contain raw data. The ERP operates in the same manner as an indexer, described above, timestamping and parsing the raw data into events. The events are searched using the parameters in the search query. The events that fulfill the search query are summarized using a reduction method, e.g., by counting the number of events that fulfill the search query, and the results are sent to the search head.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

Note that, although separate embodiments are discussed herein, any combination of embodiments and/or partial embodiments discussed herein may be combined to form further embodiments.

5.0 Implementation Mechanisms—Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
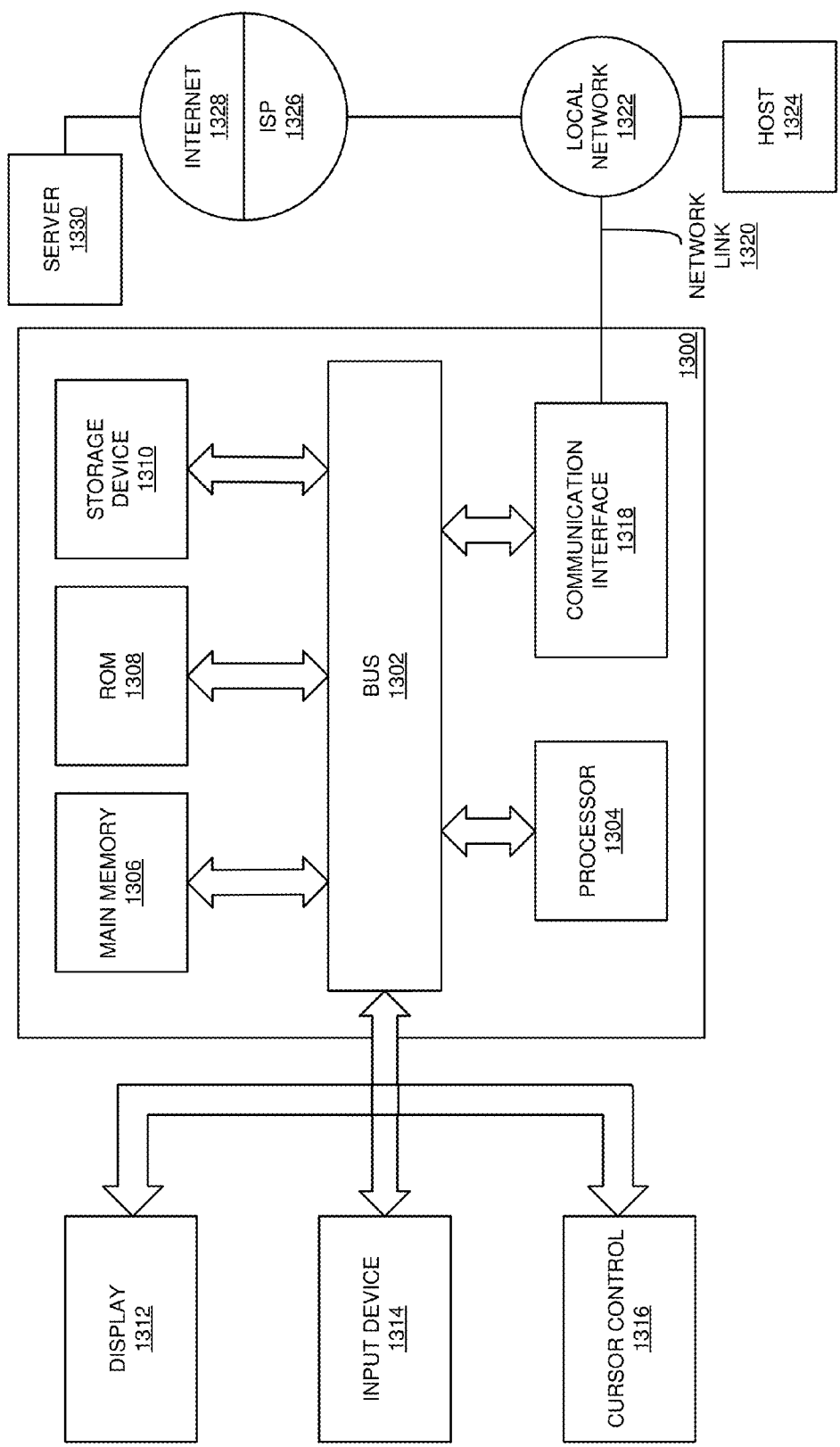
FIG. 13 illustrates a computer system upon which an embodiment may be implemented.

For example, FIG. 13 is a block diagram that illustrates a computer system 1300 upon which an embodiment may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

6.0 Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction.

In drawings, various system components are depicted as being communicatively coupled to various other components by arrows. These arrows illustrate only certain examples of information flows between the components of the depicted systems. Neither the direction of the arrows nor the lack of arrow lines between certain components should be interpreted as indicating the absence of communication between the certain components. Indeed, each component of the depicted systems may feature an open port, API, or other suitable communication interface by which the component may become communicatively coupled to other components of the depicted systems as needed to accomplish any of the functions of the systems described herein.

What is claimed is:

1. A method comprising:
    organizing a plurality of timestamped events into groups of events, each timestamped event in the plurality of timestamped events including a portion of raw machine data associated with a timestamp, wherein the portion of raw machine data reflects activity of a data source and is produced by the data source, wherein timestamped events in a group of events have associated timestamps that fall within a specific time frame;
    storing the groups of events to a field-searchable data store; and
    archiving a first group of events and a second group of events by sending data associated with the first group of events and the second group of events to an external storage system that is external to the data store, wherein the first group of events comprises timestamped events having associated timestamps that fall within a first time frame, and the second group of events comprises timestamped events having associated timestamps that fall within a second time frame, wherein the first group of events is archived to the external storage system based, at least in part, on a time span that the first group of events has been stored in the data store.

2. The method of claim 1, wherein the sending the data associated with the first group of events sends raw data associated with the first group of events to the external storage system.

3. The method of claim 1, wherein the sending the data associated with the first group of events sends timestamped raw data associated with the first group of events to the external storage system.

4. The method of claim 1, wherein the sending the data associated with the first group of events sends the timestamped events in the first group of events to the external storage system.

5. The method of claim 1, wherein the sending the data associated with the first group of events sends event data for each timestamped event in the first group of events to the external storage system.

6. The method of claim 1, wherein the external storage system is a Hadoop distributed file system.

7. The method of claim 1, wherein the external storage system is a Hadoop compatible file system.

8. The method of claim 1, wherein the archiving step further comprises:
sending the data associated with the first group of events to the external storage system after a total memory space consumed by all groups of events exceeds a limit.

9. The method of claim 1, further comprising:
receiving a search query, the search query specifying an external storage system storing the data associated with the group of events;
sending a request to the external storage system for the data associated with the group of events;
receiving the data associated with the group of events from the external storage system;
parsing the received data into a plurality of second timestamped events;
applying a late binding schema to the plurality of second timestamped events;
searching the plurality of second timestamped events using parameters from the search query;
causing results from the searching the plurality of second timestamped events to be displayed.

10. The method of claim 1, further comprising:
wherein the sending the data associated with the group of events sends raw data associated with the group of events to the external storage system;
receiving a search query, the search query specifying an external storage system storing the raw data associated with the group of events;
sending a request to the external storage system for the raw data associated with the group of events;
receiving the raw data associated with the group of events from the external storage system;
parsing the received raw data associated with the group of events into a plurality of second timestamped events, each timestamped event in the plurality of second timestamped events comprising at least a portion of the parsed received raw data associated with the group of events;
applying a late binding schema to the plurality of second timestamped events;
searching the plurality of second timestamped events using parameters from the search query;
causing results from the searching the plurality of second timestamped events to be displayed.

11. The method of claim 1, further comprising:
receiving a path name for the external storage system via a graphical user interface.

12. The method of claim 1, further comprising:
limiting bandwidth used to send the data associated with the first group of events to the external storage system by lowering a rate of data being sent to the external storage system.

13. The method of claim 1, further comprising, prior to archiving the first group of events, determining that the first group of events is to be archived.

14. The method of claim 13, wherein determining that the first group of events is to be archived comprises determining that the first group of events is inactive.

15. The method of claim 13, wherein determining that the first group of events is to be archived comprises determining that the first group of events is to be archived based on a user setting.

16. A non-transitory computer readable storage medium, storing software instructions, which when executed by one or more processors cause performance of:
organizing a plurality of timestamped events into groups of events, each timestamped event in the plurality of timestamped events including a portion of raw machine data associated with a timestamp, wherein the portion of raw machine data reflects activity of a data source and is produced by the data source, wherein timestamped events in a group of events have associated timestamps that fall within a specific time frame;
storing the groups of events to a field-searchable data store; and
archiving a first group of events and a second group of events by sending data associated with the first group of events and the second group of events to an external storage system that is external to the data store, wherein the first group of events comprises timestamped events having associated timestamps that fall within a first time frame, and the second group of events comprises timestamped events having associated timestamps that fall within a second time frame, wherein the first group of events is archived to the external storage system based, at least in part, on a time span that the first group of events has been stored in the data store.

17. The non-transitory computer readable storage medium of claim 16, wherein the sending the data associated with the first group of events sends raw data associated with the first group of events to the external storage system.

18. The non-transitory computer readable storage medium of claim 16, wherein the sending the data associated with the first group of events sends event data for each timestamped event in the first group of events to the external storage system.

19. The non-transitory computer readable storage medium of claim 16, wherein the external storage system is a Hadoop distributed file system.

20. The non-transitory computer readable storage medium of claim 16, wherein the external storage system is a Hadoop compatible file system.

21. The non-transitory computer readable storage medium of claim 16, further comprising:
receiving a search query, the search query specifying an external storage system storing the data associated with the group of events;
sending a request to the external storage system for the data associated with the group of events;
receiving the data associated with the group of events from the external storage system;
parsing the received data into a plurality of second timestamped events;
applying a late binding schema to the plurality of second timestamped events;
searching the plurality of second timestamped events using parameters from the search query;
causing results from the searching the plurality of second timestamped events to be displayed.

22. The non-transitory computer readable storage medium of claim 16, further comprising:
wherein the sending the data associated with the group of events sends raw data associated with the group of events to the external storage system;
receiving a search query, the search query specifying an external storage system storing the raw data associated with the group of events;
sending a request to the external storage system for the raw data associated with the group of events;
receiving the raw data associated with the group of events from the external storage system;
parsing the received raw data associated with the group of events into a plurality of second timestamped events, each timestamped event in the plurality of second timestamped events comprising at least a portion of the parsed received raw data associated with the group of events;

applying a late binding schema to the plurality of second timestamped events;

searching the plurality of second timestamped events using parameters from the search query;

causing results from the searching the plurality of second timestamped events to be displayed.

23. An apparatus comprising:

an organization subsystem, implemented at least partially in hardware comprising a processor and memory, that organizes a plurality of timestamped events into groups of events, each timestamped event in the plurality of timestamped events including a portion of raw machine data associated with a timestamp, wherein the portion of raw machine data reflects activity of a data source and is produced by the data source, wherein timestamped events in a group of events have associated timestamps that fall within a specific time frame;

a storing subsystem, implemented at least partially in hardware, that stores the groups of events to a field-searchable data store; and a data sending subsystem, implemented at least partially in hardware, that archives a first group of events and a second group of events by sending data associated with the first group of events and the second group of events to an external storage system that is external to the data store, wherein the first group of events comprises timestamped events having associated timestamps that fall within a first time frame, and the second group of events comprises timestamped events having associated timestamps that fall within a second time frame, wherein the first group of events is archived to the external storage system based, at least in part, on a time span that the first group of events has been stored in the data store.

24. The apparatus of claim 23, wherein the data sending subsystem sends raw data associated with the first group of events to the external storage system.

25. The apparatus of claim 23, wherein the data sending subsystem sends event data for each timestamped event in the first group of events to the external storage system.

26. The apparatus of claim 23, wherein the external storage system is a Hadoop distributed file system.

27. The apparatus of claim 23, wherein the external storage system is a Hadoop compatible file system.

28. The apparatus of claim 23, further comprising:

a search query receiving subsystem, implemented at least partially in hardware, that receives a search query, the search query specifying an external storage system storing the data associated with the group of events;

a request subsystem, implemented at least partially in hardware, that sends a request to the external storage system for the data associated with the group of events;

a subsystem, implemented at least partially in hardware, that receives the data associated with the group of events from the external storage system;

a parser subsystem, implemented at least partially in hardware, that parses the received data into a plurality of second timestamped events;

a subsystem, implemented at least partially in hardware, that applies a late binding schema to the plurality of second timestamped events;

a search subsystem, implemented at least partially in hardware, that searches the plurality of second timestamped events using parameters from the search query;

a subsystem, implemented at least partially in hardware, that causes results from the searching the plurality of second timestamped events to be displayed.

29. The apparatus of claim 23, further comprising:

wherein the data sending subsystem sends raw data associated with the group of events to the external storage system;

a search query receiving subsystem, implemented at least partially in hardware, that receives a search query, the search query specifying an external storage system storing the raw data associated with the group of events;

a request subsystem, implemented at least partially in hardware, that sends a request to the external storage system for the raw data associated with the group of events;

a subsystem, implemented at least partially in hardware, that receives the raw data associated with the group of events from the external storage system;

a parser subsystem, implemented at least partially in hardware, that parses the received raw data associated with the group of events into a plurality of second timestamped events, each timestamped event in the plurality of second timestamped events comprising at least a portion of the parsed received raw data associated with the group of events;

a subsystem, implemented at least partially in hardware, that applies a late binding schema to the plurality of second timestamped events;

a search subsystem, implemented at least partially in hardware, that searches the plurality of second timestamped events using parameters from the search query;

a subsystem, implemented at least partially in hardware, that causes results from the searching the plurality of second timestamped events to be displayed.

* * * * *